United States Patent Office 3,299,705
Patented Jan. 24, 1967

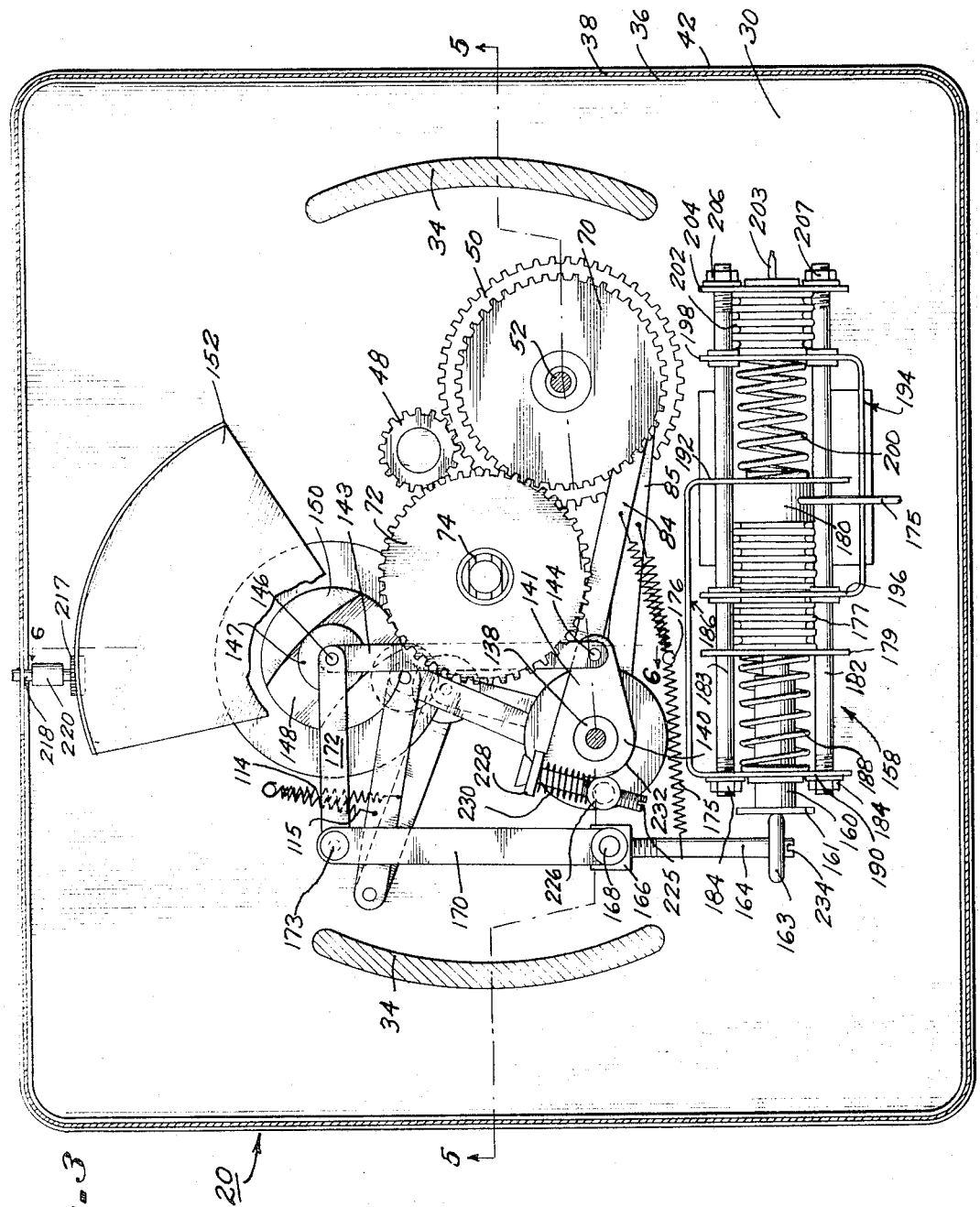

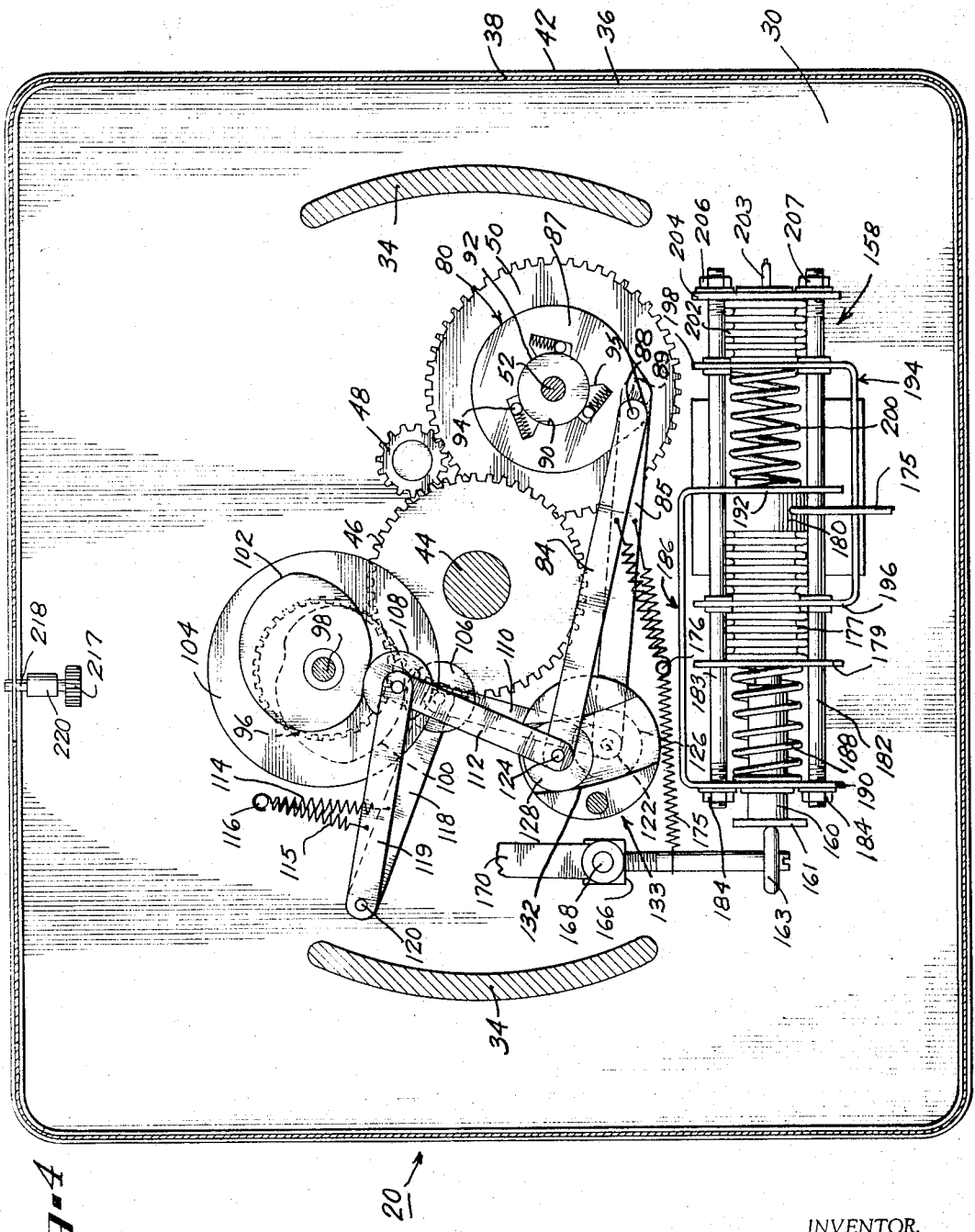

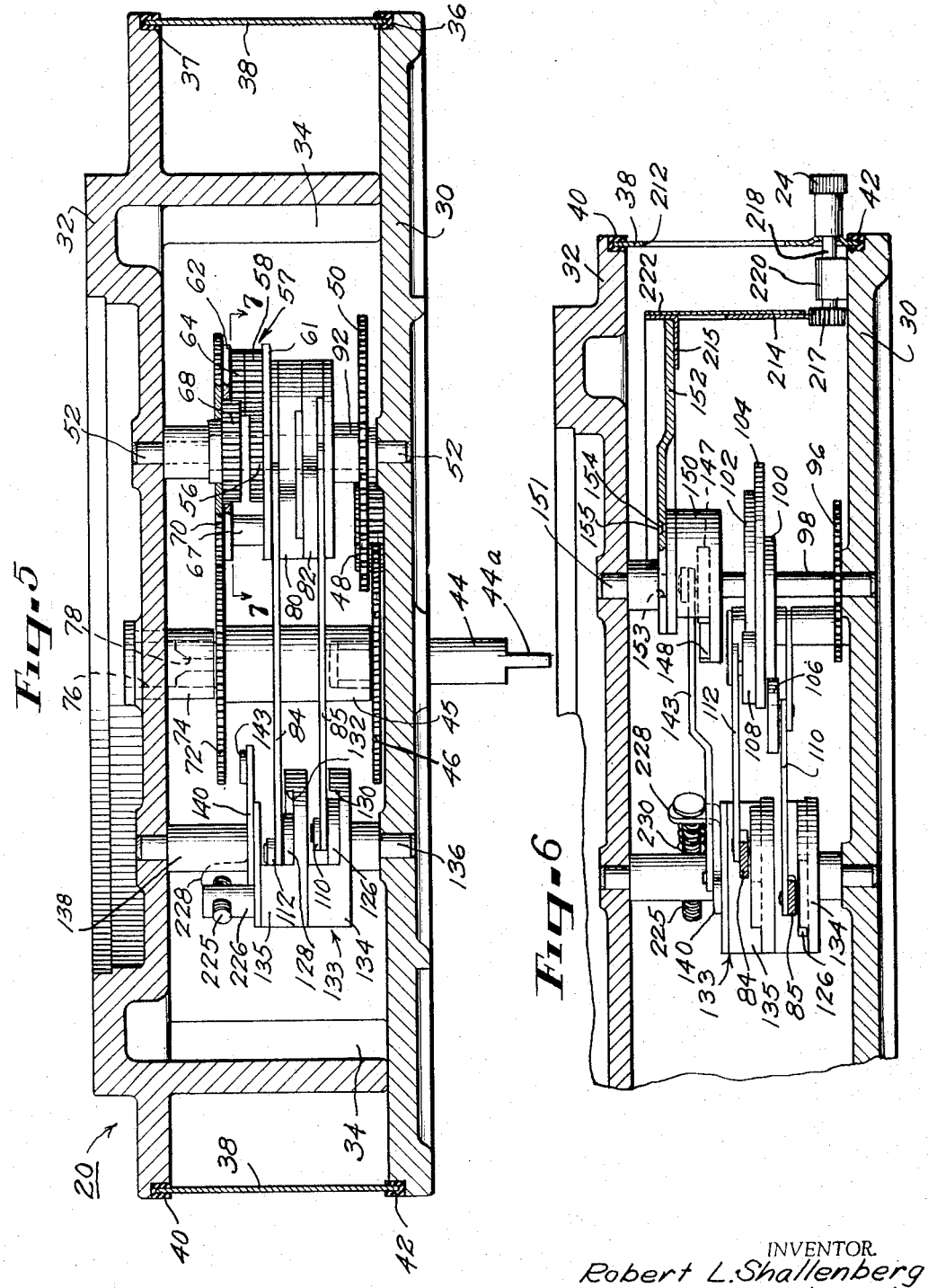

3,299,705
TEMPERATURE COMPENSATOR
Robert L. Shallenberg, Wheaton, and Otto Handwerk, Libertyville, Ill., assignors to Liquid Controls Corporation, North Chicago, Ill., a corporation of Illinois
Filed Sept. 27, 1963, Ser. No. 312,080
6 Claims. (Cl. 73—233)

The present invention generally relates to temperature compensators, and it relates more particularly to devices for automatically modifying the output from a volumetric type flow meter or similar device to compensate for the effect of temperature changes on the volume of a fluid being metered.

The most practical way of metering a quantity of a gaseous or liquid fluid is by means of a volumeter which develops a mechanical output representative of the actual volume of liquid passing through the meter. Ordinarily, the volume measured by the meter is indicated by the number of rotations of an output shaft which may be conveniently connected to a counter for providing a visual or otherwise sensable indication of the number of rotations of the output shaft of the meter. The volume of fluid varies substantially with changes in temperature and while volumetric flow meters and associated counters of the type now available on the market provide a highly accurate indication and record of the actual volume of fluid being metered, for many purposes it is the mass of the fluid which is of importance and not its volume. Of course, the mass of a liquid is related to its volume by several factors, but the most important of these is the coefficient of thermal cubicle expansion, the others being insignificant for most practical purposes. Assuming a given volumetric flow through the meter, the mass of the liquid metered varies inversely with changes in temperature, and in order to compensate for this variation in volume, it is known in the art to interconnect a temperature compensating device between the meter and the counter. Such a device has an input-output ratio inversely proportional to the ratio of the actual volume metered to the volume of the same quantity of liquid at the standard temperature of 60 degrees F. whereby the counter registers an amount representative of the mass of the fluid being metered, i.e., the counter provides a temperature compensated volumetric reading. The prior art type temperature compensators have not, however, been entirely satisfactory for several reasons. For example, such prior art devices commonly use friction drives which tend to slip or wear under varying load and ambient conditions and thereby provide incorrect readings. Other prior art devices are inherently cyclical and provide a pulsating type of correction which frequently introduces counting errors and which, moreover, subjects the mechanism to unnecessarily high loads during the periods of compensation. Moreover, the operating ranges of the prior art devices are unduly limited so that any given device cannot be used for several applications.

Therefore, a principal object of the present invention is to provide a new and improved temperature compensating coupling which rotates an output shaft an amount dependent both on the rotation of the input shaft of the coupling and on the temperature being sensed.

Another object of the present invention is to provide a new and improved temperature compensator adapted for use with volumetric flow meters.

A further object of the present invention is to provide a new and improved temperature compensator which is adapted to be connected between a volumetric flow meter and a counter and which drives the counter by an amount dependent on the output of the flow meter as modified by an amount dependent on the temperature of the fluid being metered.

A still further object of the present invention is to provide a non-cyclical or continuous acting automatic temperature compensator for use in connection with apparatus for metering a wide variety of different fluids.

Still another object of this invention is to provide a small, compact temperature compensator operable throughout a wide range of temperature values and coefficients of cubicle expansion.

Briefly, the above and further objects are realized in a preferred embodiment of the present invention by providing a non-cyclical temperature responsive, volume compensating mechanism for coupling a volumeter to a preset type counter in such a manner that the counter registers, at all times, the volume of fluid metered corrected for volumetric changes caused by temperature variations from a standard or reference value. In its broadest aspects the present invention teaches a highly accurate, continuously acting variable ratio coupling. This device employs a differential gear train having two inputs, one of which is connected so as to be positively driven by the input shaft and the other of which is driven by a mechanism which develops the temperature controlled compensating factor. These two inputs are algebraically added in the differential gear train to drive an output shaft at a rate proportional to the temperature corrected volume of the fluid being metered. Although the distribution of torque supplied to the differential from its respective inputs varies with the amount of compensation required, the larger part of the torque is applied directly from the input shaft to the differential. This enables a wider range of operation with a smaller, more compact mechanism.

The volume compensating factor is directly related to the product of the volume, the change of temperature and the coefficient of thermal cubicle expansion of the metered liquid and is supplied to the differential gear train by means of a pair of reciprocating linkages respectively acting through a pair of one-way clutches connected to the rotatable cage of the differential gear train. The linkages are cyclically driven by cams driven by the input shaft at a speed proportional to that of the input shaft and have a variable drive stroke whose length is directly related to the product of the coefficient of expansion, as manually entered into the device, and the temperature differential from a standard temperature value. To this end, the length of the drive strokes of the reciprocating linkages are controlled jointly by a temperature responsive bellows having a sensing probe located in the liquid in proximity to the meter and by an infinitely variable manual input for entering into the mechanism any desired coefficient of expansion within the range of the instrument.

Further objects and advantages and a better understanding of the present invention will be had by reference to the following detailed description taken in connection with the accompanying drawings wherein:

FIG. 3 is a top plan view of the internal mechanism of the temperature compensator of the present invention, certain portions thereof being broken away to better illustrate the said mechanism;

FIG. 4 is a view similar to FIG. 3 but taken through a lower horizontal plane;

FIG. 5 is a view taken along the lines 5—5 of FIG. 3;

FIG. 6 is a sectional view taken along the lines 6—6 of FIG. 3; and

Figure 1:
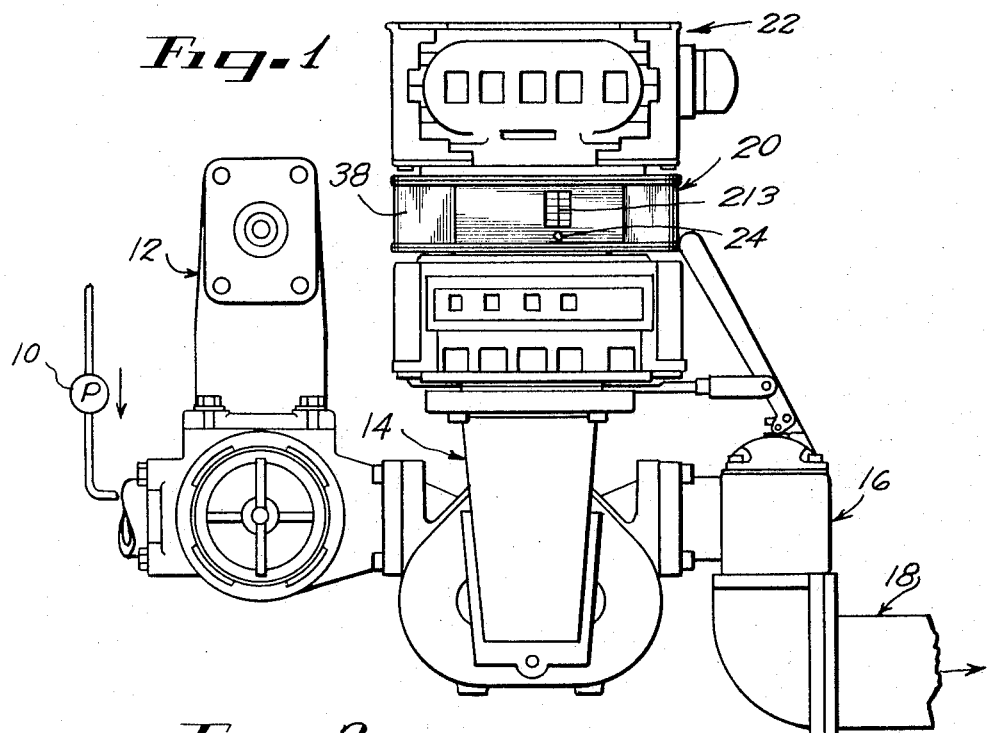
FIG. 1 is a view, partly schematic, illustrating a portion of a liquid transmission system in which the temperature compensator of the present invention finds particular application.

Referring now to the drawings and particularly to FIG. 1 thereof, a liquid transmission system includes a pump schematically indicated at 10 for pumping liquid from a supply tank (not shown) through an air eliminator 12 from which it passes to a volumetric flow meter 14. After passing through the meter 14 the liquid flows through a pressure operated control valve 16 and to an outlet conduit 18 from which it passes to other parts of the system. Mounted directly on top of the meter and preset counter 14 is a temperature compensator 20 which, in turn, supports a register 22 which provides a numerical record on the face thereof of the volume of liquid which has passed through the meter 14 as compensated for changes in the volume resulting from temperature variations from a standard temperature of, for example, 60 degrees F. This system, exclusive of the temperature compensator 20, is more fully described in United States Patent No. 3,083,-874.

The temperature compensator 20 is driven from the output shaft of the meter 14 which rotates at a rate proportional to the volumetric rate of flow of liquid through the meter 14, and the counter 22 is in turn driven by the output of the temperature compensator 20. As described in detail hereinafter, the temperature compensator 20 includes a temperature sensing probe (not visible in FIG. 1) which may be positioned at a location for sensing the temperature of the liquid entering the meter, and the compensator 20 further includes a manually adjustable knob 24 for entering the coefficient of thermal cubicle expansion of the particular liquid being metered.

Figure 2:
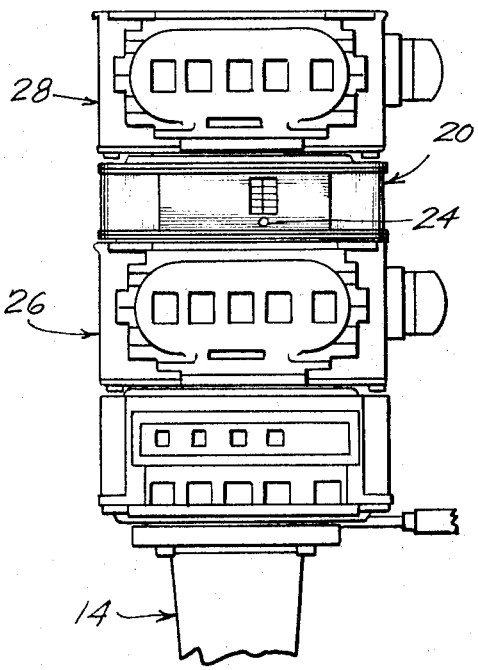
FIG. 2 is a fragmentary view showing another way in which the temperature compensator of the present invention may be used with a volumetric flow meter.

Referring to FIG. 2, there is shown an arrangement suitable for calibrating the temperature compensator 20. Only the upper portion of the flow meter 14 is illustrated, and to it is directly connected a gross counter 26 for registering the actual volume of liquid flowing through the meter 14. Mounted on top of the counter 26 and connected to be mechanically driven thereby is the temperature compensator 20 which in turn supports and drives a net counter 28. The gross counter 26 thus registers the actual volumetric flow of liquid through the meter 14 while the net counter 28 registers the volumetric flow of liquid through the meter 14 when compensated for the difference in the liquid temperature and the standard temperature of 60 degrees F.

Refer now to FIGS. 3, 4, 5, and 6 for a better understanding of the construction and operation of the temperature compensator 20 which includes a housing formed by a rectangular base plate 30 and a top plate 32 which is also rectangular in cross section and which includes a plurality of depending arcuate flange portions 34. The flanges 34 cooperate with the top and bottom flat plate sections to provide a generally cylindrical chamber in which the operating parts of the temperature compensator 20 are primarily mounted. The bottom plate 30 includes an annular peripheral rabbet 36 on the upper side thereof and the top plate 32 includes a similar downwardly facing rabbet 37. A shroud 38 formed of thin strip of a suitable sheet material such as stainless steel is secured by means of a pair of U-shaped gasket strips 40 and 42 in the rabbets 36 and 37, thereby to provide a housing which is attractive in appearance and which, in addition, has a peripheral envelope approximating that of the top portion of the flow meter and preset counter 14 with which the compensator 20 is primarily adapted for use.

Figure 7:
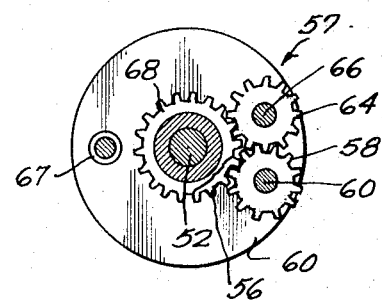
FIG. 7 is a sectional view taken along the line 7—7 of FIG. 5.

As best shown in FIG. 5, the temperature compensator 20 of the present invention includes an input shaft 44 having an axially depending flat key portion 44A which is adapted to be received in a complementary recess in the output shaft of the associated flow meter 14 whereby the input shaft 44 rotates at an angular velocity directly related to the rate of flow through the associated meter. The input shaft 44 is suitably journalled in a centrally disposed aperture in the base plate 30 and a spur gear 46 is keyed to the shaft 44 just above the base plate 30. The upper end of the shaft 44 is journalled in a cylindrical spacer 45. The gear 46 mates with an idler gear 48 and thereby drives a spur gear 50 which also mates with the idler gear 48. The gear 50 is keyed to a jack shaft 52 journalled in the base plate 30 and in the top plate 32. Also keyed to the shaft 52 is a sun gear 56 which is part of a differential mechanism or gear train 57. Within the differential mechanism 57, the sun gear 56 drives a planet gear 58 which is freely rotatable on a jackshaft 60 extending between a pair of plates 61 and 62 which form the cage of the differential mechanism 57. The planet gear 58, as best shown in FIG. 7, meshes with and drives a second planet gear 64 which is mounted on a jackshaft 66 suitably secured between the cage plates 61 and 62. An additional spacer stud 67 is mounted between the cage plates 61 and 62 to maintain the plates 61 and 62 in mutually parallel relationship. The planet gear 64 mates with and thus drives an output sun gear 68 which is integral with a spur gear 70 which mates with and drives a gear 72 keyed to the spacer shaft 45 suitably journalled in a centrally disposed bushing 74 mounted in the top plate 32. The shaft 45 is adapted to be coupled to a preset counter or other device having a shaft identical to the shaft 44. Accordingly, the outer and spacer shaft 45 has an axially directed rectangular slot 78 for receiving a depending axial key on the shaft of the associated counter or other device.

As thus far described it will be apparent that as the input shaft 44 is rotated, torque is coupled to the output shaft 45 through the differential gear train 57. Accordingly, by simultaneously rotating the cage of the differential mechanism 57 the shaft 45 is rotated at a speed proportional to the speed of the sun gear 56 plus the speed of the cage 61, 62. In a commercial embodiment of this compensator 20, the drive ratio of the input shaft 44 to the output shaft 45, with the differential cage held stationary, is fifty-six to forty-eight. This is the maximum negative compensation obtainable with the particular compensator but other compensators embodying this same invention have been built to provide a greater amount of compensation where higher temperatures are encountered.

In order to rotate the cage of the differential mechanism 57 thereby to add the temperature compensating factor to the input supplied via the sun gear 56, there is provided in accordance with an important feature of the present invention a pair of one-way Sprague clutches 80 and 82 which are respectively driven by a pair of reciprocable linkage members 84 and 85. The clutches 80 and 82 are identical and as best shown in FIG. 4, the clutch 80 comprises a circular plate 87 to which the linkage member 84 is pivotally connected by means of a stud 88. A stud 89 pivotally connects the linkage member 85 to the clutch plate 82 in a like manner. The plate 87 includes a central circular aperture 90 which rotatably receives a cylindrical shaft 92 which is a fixed part of and depends from the cage plate 61 through the clutches 80 and 82. The cage plates 61 and 62 are centrally apertured and freely receive the shaft 52 on which they are rotatably mounted. A plurality of spring-loaded rollers 94 are mounted in respective ones of a plurality of recesses 95 in the plate 87 such that the rollers 94 are resiliently urged against the shaft 92 when the plate 87 is rotated in a counterclockwise direction as viewed in FIG. 4. On the other hand, the plate 87 may rotate freely with respect to the shaft 92 in a clockwise direction. The operation of this type of clutch is well known in the art and need not be further described.

As mentioned hereinbefore and as described more fully hereinafter, the linkage members 84 and 85 are reciprocated at a frequency directly related to the rotational velocity of the input shaft 44 and the length of the stroke of the linkage members 84 and 85 is adjusted by an amount dependent upon the expansion or contraction of the liquid from a standard level. This amount is proportional to the product of the coefficient of expansion and the difference in temperature from a standard value. Moreover, the linkage members have overlapping drive strokes thereby to cause continuous and non-cyclical rotation of the shaft 92.

In order to reciprocate the linkage members 84 and 85 at a frequency which is directly related to the rotational speed of the input shaft 44 and thus at a frequency proportional to the volume being metered, the gear 46 mates with and therefore drives a spur gear 96 which is keyed to a stub shaft 98 suitably journalled at its lower end in the base plate 30. A pair of straight-line or linear cams 100 and 102 are fixed to the shaft 98 and are oriented at 180° with respect to one another and have overlapping linear cam portions. The cams 100 and 102 are separated by a circular spacer disc 104 also mounted on the shaft 98, and a pair of freely rotatable follower rollers 106 and 108 respectively ride against the edge camming surfaces of the cams 100 and 102. The follower rollers 106 and 108 are freely and rotatably mounted on a pair of respective linkage arms 110 and 112, and the rollers are resiliently urged into engagement with the camming surfaces of the cams 100 and 102 by means of a pair of tension springs 114 and 115 which are attached at one end to a stud 116 mounted between the plates 30 and 32 and which are connected at their other ends to a pair of arms 118 and 119 which respectively connect to the rollers 106 and 108 and which are pivoted about a stud 120 mounted between the top and bottom housing plates 32 and 30. The cams 100 and 102 are thus rotated at an angular velocity directly related to the rotational speed of the input shaft 44, and the linkage members 110 and 112 are reciprocated or cycled at a rate or frequency directly related to the rotational speed of the input shaft 44. Stated another way, the linkage arms 110 and 112 reciprocate through a fixed number of cycles for each revolution of the input shaft 44. Moreover, the length of the stroke of the linkage arms 110 and 112 is fixed and is in no way adjustable in this particular device. If desired however, such length could be adjustable to compensate for dimensional tolerances in the various parts of the overall mechanism.

As best shown in FIG. 4, the linkage arms 110 and 112 are respectively connected through a pair of pintles 122 and 124 to the linkage members 84 and 85 which are connected to and drive the clutches 80 and 82. Freely rotatable on the pintles 122 and 124 are a pair of rollers 126 and 128 which ride in a pair of arcuate guide grooves or channels 130 and 132 in a guide block assembly 133. For convenience of manufacture the guide block assembly 133 comprises a pair of guide blocks 134 and 135 (best shown in FIG. 5) which are fixedly connected together into an integral unitary assembly. The guide block assembly 133 is mounted between the plates 30 and 32 on a pair of aligned stub shafts 136 and 138 which are suitably journalled in the housing plates 30 and 32, whereby the guide block assembly 133 may be adjustably rotated about the principle longitudinal axis of the aligned shafts 136 and 138.

The guide channels 130 and 132 are arranged one above the other and have a width equal to the diameter of the rollers 126 and 128. The radius of curvature of the channels is equal to the effective length of each of the linkages connecting the guide block assembly 133 to the clutches 80 and 82. More particularly, the outermost and innermost walls of the channel 132, for example, each have a radius of curvature equal to the distance between the center of rotation of the roller 128 and the central axis of the pivot pin 88 which connects the linkage member 84 to the clutch plate 87 plus or minus, respectively, the radius of the roller 128. Inasmuch as the guide channel 130 is identical in construction to the channel 132 it need not be described herein.

As the linkage arms 110 and 112 reciprocate under the influence of the cams 100 and 102, the rollers 126 and 128 are caused to move back and forth along the guide channels 130 and 132. The linkage members 84 and 85 are thus reciprocated through a stroke whose length depends upon the orientation of the guide block assembly 133 and hence the guide channels 130 and 132 relative to the points of connection of the linkage members 84 and 85 to the clutch plates. If the guide channel 132 and the corresponding lower channel 130 are disposed in concentric relationship with the pivot pins 88 and 89 reciprocation of the linkage members 84 and 85 does not result from reciprocation of the linkage arms 110 and 112. This is so since even though the rollers 126 and 128 actually travel back and forth along the guide channels 130 and 132 the rollers at all times remain at the same distance from the respective points of connection to the clutch plates. Hence the linkage members 84 and 85 merely oscillate about the points of pivotal connection to the clutch plates and no torque is exerted through the clutches 80 and 82 to drive the cage of the differential gear train 57. Accordingly, no compensating factor is added into the differential and the output shaft is driven at the maximum reduction ratio of the mechanism. For all other positions of the guide channels 130 and 132, a compensating factor is added to the output via the cage of the differential mechanism 57.

In order to rotate the guide block assembly 133 by an amount necessary to add the proper compensating factor to the output from the differential mechanism 57, a link plate 140 (FIG. 3) is secured to the shaft 138 and thus moves in unison with the guide block assembly 133. The link plate 140 includes a radially extending ear portion 141 to which a control linkage arm 143 is pivotally connected by means of a suitable pin 144. The opposite end of the linkage arm 143 is pivotally connected by means of a pin 146 to a roller 147 which rides in a guide channel 148 provided in a guide block 150. The guide channel 148 has an outer radius equal to the effective length of the linkage arm 143 plus the radius of the roller 147. The guide block 150 is mounted on but freely rotatable with respect to a stub shaft 151 and the aligned shaft 98 and is rotatably adjusted about these shafts 151 and 98 by means of a quadrant plate 152 which includes an aperture 153 loosely surrounding the shaft 151 and which is adjustably secured to the guide block 150 by means of a screw 154 which extends through an arcuate slot 155 in the quadrant plate 152. The relative position of the quadrant plate 152 with respect to the guide block 150 is set at the factory when the machine screw 155 is initially tightened and need not be changed thereafter. In the field, the quadrant plate 152 may be adjustably rotated about the shafts 151 and 98 in order to set the compensator for use with a material having a particular coefficient of cubicle expansion. As will become clear as the description proceeds, the arcuate position of the quadrant plate 152, which constitutes the coefficient of expansion factor, determines the effect of changes in temperature on the amount of compensation which is entered into the differential mechanism 57 via the cage thereof.

The position of the roller 147 along the guide channel 148 is controlled by a temperature responsive bellows assembly 158 which includes an axially movable output element 160 which is positionable along its longitudinal axis in accordance with the temperature of the liquid being metered. The rod-like element 160 has a hexagonal face plate portion 161 which abuts against a follower disc 163 fixedly mounted on a rod 164 threadedly received in a pivot block 166. As shown, the block 166 is pivotally mounted on a stud 168 secured between the housing plates 30 and 32. A lever arm 170 is fixedly connected at one end to the pivot block 166 and as best shown in FIG. 3 is pivotally connected at its other end to a link 172 by means of a rivet 173. The link 172 is in turn pivoted at its other end on the pin 146 which thereby connects it to the roller 147. A spring 175 is stretched between the rod 164 and a stud 176 fixedly mounted on the plate 30 thereby to resiliently hold the disc 163 against the plate 161 on the output element 160 of the bellows assembly 158.

It may thus be seen that as the output element 160 of the bellows assembly 158 moves outwardly (to the left in FIG. 3) the lever 170 is pivoted clockwise thereby to move the roller 147 downwardly and to the right when the guide block 150 is in the illustrated position. The effect of this motion is to rotate the guide block assembly 133 in a clockwise direction. If, however, the guide block 150 has been in a position such that its radius of curvature were concentric with the pin 144, this condition existing when the liquid being metered has a coefficient of expansion of zero, moving the roller 147 to the right would have merely resulted in the linkage member 143 pivoting about the pin 144 with no motion being translated to the linkage plate 141 and thus to the guide block assembly 133. In this condition of operation the amount of compensation does not vary with changes in temperature and this is, of course, as it must be where the volume of the liquid does not vary with temperature.

When the output element 160 of the bellows assembly 158 moves axially to the right in FIG. 3 the spring 175 pulls the disc 163 to the right thereby to pivot the lever 170 in a counterclockwise direction. This action moves the roller 147 to the left and with the guide block 150 in the illustrated position this also causes the roller 147 to move upwardly thereby rotating the guide block assembly 133 in a counterclockwise direction.

The bellows assembly 158 is best shown in FIGS. 3 and 4 and it includes a plurality of expandable bellows for axially positioning the rod 160 in accordance with the temperature sensed thereby. Normally, this temperature is the temperature of the liquid being metered. To this end, a conduit 175 is connected to a probe (not shown) which is adapted to be strategically located in the liquid being metered in as close a position to the volumeter as is reasonably possible. The sensing probe is of a type well known in the prior art and includes a bulb portion which connects to the conduit 175 which in turn connects with a bellows 177. The bellows 177, the conduit 175, and the bulb (not shown) form a closed system which is entirely filled with a fluid which expands with increases in temperature.

The bellows 177 is located between and fixedly connected to a plate 179 and a block 180 which is passaged to connect the tube 175 to the bellows 177. The plate 179 is slidably mounted on a pair of parallel support rods 182 and 183. The rods 182 and 183 are threaded at their left-hand ends as shown in FIGS. 3 and 4 and a pair of nuts 184 are threadedly secured thereon to provide stops against which a U-shaped bracket 186 is pressed by a coil spring 188 mounted between the plate 179 and a plate portion 190 of the bracket 186. The bracket 186 also has a plate portion 192 slidably fitted on the rods 180 and 182. A U-shaped bracket 194 has a pair of parallel plate portions 196 and 198 slidably mounted on the rods 180 and 182 and a coil spring 200 is compressed between the plate portions 192 and 198. A bellows 202 having a normally sealed off filler tube 203 is mounted between the plate portion 198 and a plate 204 held in place on the rods 183 and 182 by a pair of nuts 206 and 207. Accordingly, as the fluid in the probe expands, the bellows 177 also expands thereby tending to move the element 160 in an outward direction (to the left in FIGS. 3 and 4).

It is necessary to compensate for the ambient temperature changes which will also affect the volume of the fluid in the bellows 177 annd in the conduit 175 due to the ambient temperature at the location of the compensator 20. For this purpose, the bellows assembly 158 includes the ambient temperature compensating bellows 202 which is filled with a fluid having a negative coefficient of cubical expansion equal in absolute value to the coefficient of cubical expansion of the fluid in the bellows 177. Accordingly, as the fluid which fills the bellows 177 expands as a result of an increase in the ambient temperature, the bellows 202 expands a like amount permitting the block 180 to move to the right. As a consequence, the element 160 moves through a distance equal to the difference in the lengths of movement of two bellows 177 and 202. Preferably, these bellows have equal volumes. Compensation for expansion of the bellows 177 due to the ambient temperature at the bellows is thus compensated by the bellows 202.

In order to adjust the position of the quadrant plate 152 thereby to enter the coefficient of cubicle expansion factor into the mechanism, the thumb screw 24 extends from the shroud 138 directly beneath a viewing aperture 212 which may, if desired, be covered by a transparent plate (not shown). This plate may include graduations thereon or a vertical reference line 213 as shown in FIG. 1. Mounted on the periphery of the quadrant plate 152 and depending therefrom is an arcuately shaped bracket 214 having a flange portion 215 fixedly secured to the bottom side of the plate 152. A friction wheel 217 is mounted on a shaft 218 which extends in and is secured to the thumb screw 24. The shaft 218 is journalled in a bearing 220 mounted on the base plate 30. Rotation of the thumb screw 210 rotates the quadrant plate 152. A graduated face plate 222 is bonded to the outwardly facing surface of the bracket 214 and includes printed graduations for facilitating adjustment of the quadrant plate 152 in accordance with the cofficient of cubicle expansion of the liquid being metered. The dial face 222 is visible through the viewing aperture or window 212 and by locating the particular coefficient printed on the face of the dial with respect to the reference line 213 the temperature compensating mechanism is adjusted for the particular liquid being metered.

In order to compensate for the necessary dimensional tolerances involved in the manufacture of so many different parts, certain factory adjustments are incorporated in this mechanism. The adjustment of the quadrant plate 152 with respect to the guide block 150 by means of the screw and slot arrangement 154, 155 has been described hereinbefore. In addition, the position of the link plate 141 relative to the guide block assembly 133 is adjustable by means of a screw 225 which is threadedly received in a stud 226 extending upwardly from the upper guide block 135. The screw freely extends through an upstanding tab 228 on the plate 141. A coil spring 230 surrounds the screw 225 to urge the tab 228 against the head of the screw 225 in a clockwise direction. It will be noted that the plate 141 has a radius 232 which fits snugly against the stud 226.

Adjustment of the position of the disc 163 relative to the pivot point located at the center of the pivot block 166 is provided by means of the threaded connection between the rod 164 and the guide block 166. A screwdriver slot 234 in the end of the rod 164 facilitates this adjustment. It will be readily apparent to those skilled in the art that for a given axial movement of the element 160 of the bellows assembly 158 more or less pivoting of the lever 170 will result when the disc 160 is moved towards or away from the pivot block 166.

*Operation*

In order to insure a complete understanding of the present invention the following typical operations are described. When a liquid flows through the volumetric flow meter 14, rotation of the input shaft 44 of the temperature compensator 20 will result and the speed of rotation of the shaft 44 will be directly related to the rate of volumetric flow through the meter 14. If the counter 22 were to be connected directly to the meter 14, it would register the precise volume of liquid flowing through the meter 14. However, as discussed hereinbefore, this figure is not meaningful inasmuch as the volume of the liquid may change so greatly as a result of changes in temperature. The temperature compensator 20 thus modifies the rate of rotation of the output shaft from the meter 14 and couples the modified rate of rotation to the counter 22. Inasmuch as the standard temperature used in most industries in 60 degrees F. the temperature compensator is such that the output shaft 76 and the input shaft 44 rotate at the same rate of speed when the temperature of the liquid being metered is 60 degrees F. irrespective of the coefficient of cubicle expansion of the liquid. Furthermore, when the liquid being metered has a coefficient of expansion of zero, the output shaft 74 and input shaft 44 rotate at the same rate of speed irrespective of the temperature of the liquid. Rotation of the shaft 44 is coupled through the gears 46, 48 and 50 to the sun gear 56 of the differential gear train 57 whose output sun gear 68 is directly connected to the gear 70 which drives the output shaft 45 through the gear 72 which is pinned thereto. In a temperature compensator embodying the present invention and designed for commercial use in the petroleum industry, the ratios between the input shaft 44 and the output shaft 45 (the input to output ratio) is precisely forty-eight to fifty-six. It can be mathematically computed that this condition should exist when the temperature of the liquid being metered is 139.6 degrees F. and the coefficient of cubicle expansion is 0.0018. Therefore, when the quadrant plate 152 has been set by the thumb screw 24 to enter the coefficient of expansion of 0.0018 and when the temperature of the liquid being metered is 139.6 degrees F. no torque is applied to the cage of the differential gear train 57 whereby the fifty-six to forty-eight speed ratio exists. Clearly, the counter 22 will then register an amount substantially less than the actual volume of the liquid flowing through the meter 14. This is the maximum condition of liquid expansion which can be compensated for by a compensator unit 20 having this particle drive ratio.

Considered in greater detail when the temperature of the liquid being metered is 60 degrees F. the cage of the differential gear train 57 is continuously rotated by an amount such that the gears 46 and 72 rotate at the same speed whereby the input shaft 44 and the output shaft 45 rotate in unison. When the probe (not shown) of the bellows assembly 158 is located in a liquid having a temperature of 60 degrees F. the bellows 177 and the bellows 202 will occupy a certain position depending on the ambient temperature at the location of the bellows assembly 158 and the rod 160 and the hexagonal face plate 161 will be at a particular position. The spring 175 urges the disc 163 against the plate 161 whereby the roller 147 is at a particular position along the guide channel 148 in the guide block 150.

When the temperature being sensed is 60 degrees F. the pin 146 about which the roller 147 is rotatable is aligned with the shaft 98. Therefore, at this standard temperature, rotation of the quadrant plate 152 has no effect whatever since the guide channel 148 is merely rotated about the axis of rotation of the roller 147. As indicated above, since 60 degrees F. is the standard temperature the coefficient of expansion of the material being metered should not affect the output of the compensator 20. Therefore, the link plate 141 and consequently the guide block assembly 133 is positioned so that as the linkage arms 110 and 112 reciprocate back and forth, the rollers 126 and 128 move back and forth along the guide channels 130 and 132 to rotate the shaft 92 through the clutches 82 and 80 by an amount necessary to enter into the differential gear train 57 the cage rotation required to rotate the gear 72 at the same speed as the gear 46.

Assuming a temperature of, for example, 80 degrees F., rotational adjustment of the quadrant plate 152 causes movement of the roller 147 along the channel 148 thereby to rotate the guide block assembly 133 to modify the length of the stroke of the linkage members 84 and 85. If the coefficient of expansion is greater than that previously set by the plate 152 the stroke of the linkage members 84 and 85 is reduced by virtue of the fact that the guide channels 130 and 132 are rotated into closer concentricity with the pins 88 and 89 on the clutch plates. On the other hand, if the coefficient of expansion is less than that to which the quadrant plate 152 had previously been set the guide channels 130 and 132 will be rotated further out of concentricity with respect to the pins 88 and 89, and the length of the stroke of the linkage members 84 and 85 will be increased.

When the quadrant plate 152 is set at a particular position other than that corresponding to a coefficient expansion of zero whereby the guide block 150 would be oriented with the guide channel 158 concentric with the pin 144, an increase in temperature causes the lever 170 to move clockwise thereby to move the roller 147 downwardly and to the right whereby to rotate the guide block assembly 133 clockwise to decrease the length of the stroke of the linkage members 84 and 85. Contrarywise, if the temperature is reduced the roller 147 is moved to the left and upwardly thereby to rotate the guide block assembly 133 counterclockwise to increase the length of the stroke of the linkage members 84 and 85.

Although not absolutely necessary, it is preferable that the differential cage be continuously rotated so that the counter 22 will at all times provide an instantaneously accurate indication of the amount of liquid which has flowed through the meter 14 and so that pulsating loads are not applied to the mechanism. For this purpose, the cams 100 and 102 have somewhat overlapping cam surfaces such that the operating strokes of the linkage members 84 and 85 also overlap. In this manner, for example, near the end of the forward stroke of the linkage member 84 the linkage member 85 commences its forward stroke so that both linkage members 84 and 85 are, for a short time, simultaneously driving the clutches. In order to further reduce the load on the mechanism, the gears 46 and 96 have a 1.5 to 1 ratio thereby enabling shorter drive strokes of the linkage members 84 and 85 with a consequent reduction in the size of the parts.

It will be apparent from the foregoing description that the temperature compensator 20 of the present invention enables infinite variation of both the temperature input to the unit and the coefficient of expansion input to the unit. Moreover, this temperature compensator provides a precise infinitesimal control of the output speed relative to the input speed in response to temperature changes.

It will be appreciated that while this mechanism is described in connection with a temperature compensator for use with a volumetric flow meter and an associated counter, the same mechanism may be used in connection with other types of devices wherein a temperature responsive, variable drive ratio is required. Other novel features of the invention as described hereinbefore will find use in various mechanical drive mechanisms.

While the present invention has been described in connection with a particular embodiment thereof, it will be understood that those skilled in the art may make many changes and modifications without departing from the invention. Accordingly, it is intended by the appended claims to cover all such changes and modifications as fall within the true spirit and scope of this invention.

What is claimed is:

1. A temperature coupling device for varying the velocity of rotation of an output shaft by an amount continuously dependent on the temperature of a fluid being metered, comprising an input means connected to be driven at an angular velocity dependent on the volume of the fluid being metered, one way clutch means having a plurality of inputs and an output shaft, a plurality of reciprocable linkage means respectively connected to said plurality of inputs, means drivingly connected between said linkage means and said input means for alternately reciprocating said linkage means such that the driving stroke of each of said linkage means overlaps the driving stroke of another whereby one or more of said linkage means is at all times moving in the driving direction such that said output shaft is continuously driven by said linkages, and temperature responsive means for varying the length of the said stroke of said linkages to control the velocity of rotation of said output shaft.

2. A temperature compensator coupling comprising, an input shaft, a differential gear train including a first rotatable input member and a second rotatable input member, said differential gear train further including an output member which is rotatable in response to the rotation of one or both of said input members by an amount proportional to the sum of the angular rotations of said input members, means coupling said input shaft to said first rotatable input members, camming means coupled to said input shaft to be driven thereby, follower means operatively connected to said camming means, reciprocable means driven by said follower means at a frequency of reciprocation proportional to the speed of rotation of said input shaft, means for adjustably controlling the length of the stroke of said reciprocable means, one-way drive means coupling said reciprocable means to said second differential input, said means for controlling the length of the stroke of said reciprocable means including temperature responsive means and means adjustable in accordance with a predetermined coefficient of cubicle expansion within a range of said coefficients, wherein a guide block member having an arcuate guide channel therein, a roller member slidable along said channel, said temperature responsive means being connected to one of said members, and said means adjustable in accordance with said coefficient of cubical expansion being connected to the other of said members.

3. A coupling as set forth in claim 2 wherein said temperature responsive means is connected to said roller member and positions said roller member along said channel in relation to the temperature to which said temperature responsive means responds.

4. A coupling according to claim 3 wherein said reciprocable means comprises a plurality of linkages, and said one-way drive means includes a plurality of one-way clutches respectively connected to said linkages.

5. A temperature compensating coupling device for varying the velocity of rotation of an input shaft by an amount continuously dependent on the temperature of a fluid being metered, comprising an input means connected to be driven at an angular velocity dependent on the volume of a fluid being metered, a plurality of cams driven by said input means, a plurality of cam followers operatively connected to said cams to be driven thereby, a plurality of linkages connected to respective ones of said cam followers for reciprocal movement thereof by rotation of said cams, one-way clutch means connected to said linkages to be driven thereby, means coupling said clutch means to said output shaft whereby said shaft is rotated by the reciprocation of said linkage, and temperature responsive means for varying the length of the stroke of said linkages to control the velocity of rotation of said output shaft.

6. The invention as set forth in claim 5 wherein said cams have overlapping cam surfaces whereby said linkages drive said clutch means in unison during a portion of the reciprocal movement thereof whereby said output shaft is continuously rotated by said linkages.

References Cited by the Examiner

UNITED STATES PATENTS

| 2,162,375 | 6/1939 | Chrisman. | |
| 2,764,901 | 10/1956 | Thoresen | 73—233 X |
| 2,884,793 | 5/1959 | Bilketer | 73—233 X |
| 3,169,399 | 2/1965 | Allport et al. | 73—233 |

FOREIGN PATENTS

| 614,238 | 6/1935 | Germany. |

JAMES J. GILL, *Acting Primary Examiner.*

RICHARD C. QUEISSER, *Examiner.*

EDWARD D. GILHOOLY, *Assistant Examiner.*